A. O. GARDINER.
NUT LOCK.
APPLICATION FILED FEB. 14, 1913.
1,164,494.
Patented Dec. 14, 1915.
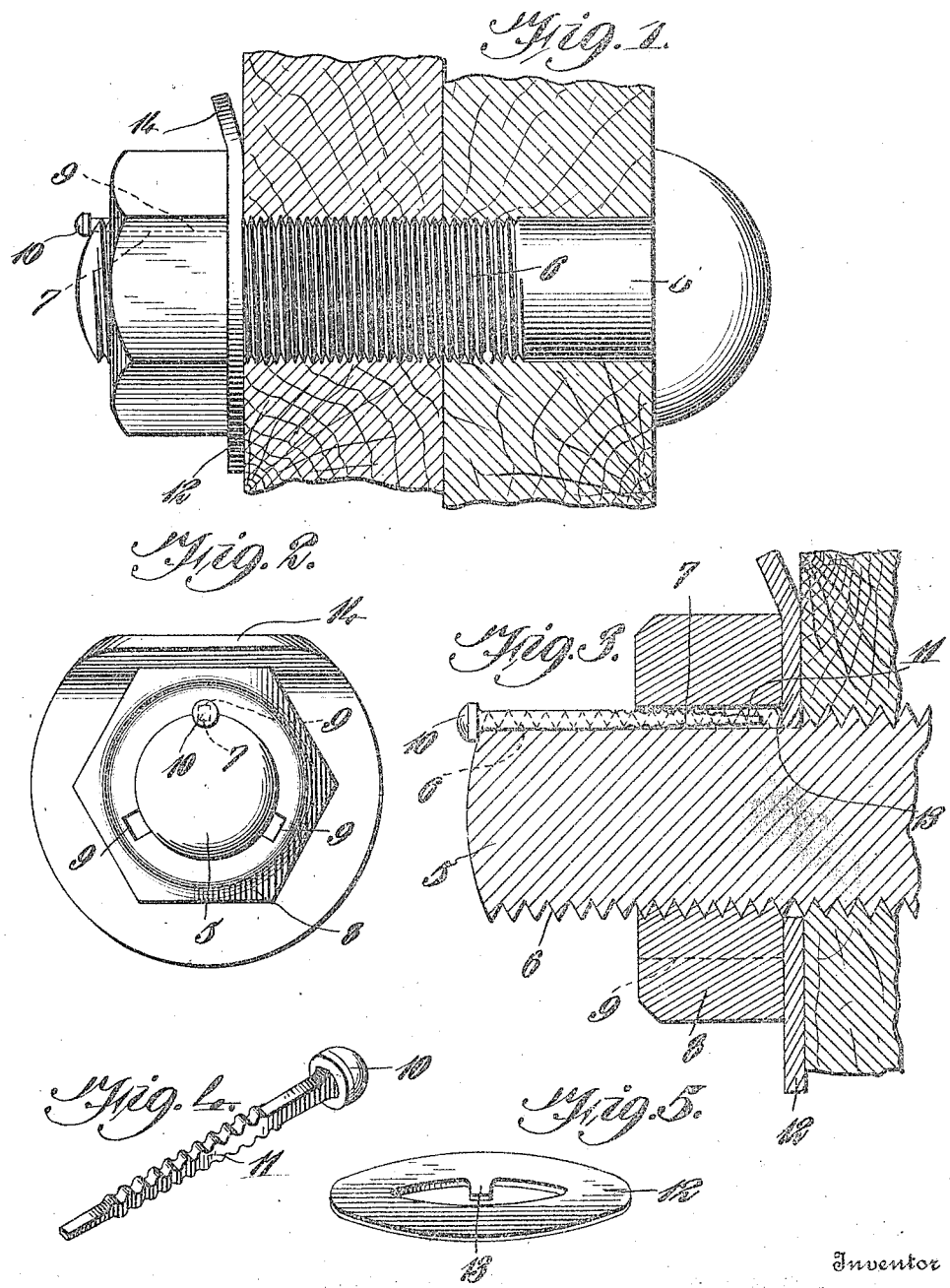

UNITED STATES PATENT OFFICE.

ANWYL O. GARDINER, OF OAKLAND, CALIFORNIA, ASSIGNOR OF ONE-HALF TO DIEDRICH KNABBE AND ONE-HALF TO D. KNABBE, BOTH OF OAKLAND, CALIFORNIA.

NUT-LOCK.

1,164,494.  Specification of Letters Patent.  Patented Dec. 14, 1915.

Application filed February 14, 1913. Serial No. 748,443.

*To all whom it may concern:*

Be it known that I, ANWYL O. GARDINER, a citizen of the United States, residing at Oakland, in the county of Alameda and State of California, have invented new and useful Improvements in Nut-Locks, of which the following is a specification.

The invention relates to nut locks, and has for its primary object to provide a nut lock wherein a nut can be readily and easily adjusted upon a bolt and locked against loosening thereon, thus avoiding the possibility of the accidental loosening of the nut or the working of the same from the bolt.

Another object of the invention is the provision of a nut lock which is extremely simple in construction, thoroughly reliable and efficient in its operation, and inexpensive to manufacture.

With these and other objects in view, the invention consists in the construction, combination and arrangement of parts as will be hereinafter more fully described, illustrated in the accompanying drawing, and pointed out in the claim hereunto appended.

In the drawings:—Figure 1 is a side elevation of a bolt showing the nut lock constructed in accordance with the invention and mounted thereon. Fig. 2 is an end elevation thereof. Fig. 3 is a fragmentary vertical longitudinal sectional view thereof. Fig. 4 is a perspective view of the locking pin. Fig. 5 is a perspective view of the washer employed.

Similar reference characters indicate corresponding parts throughout the several views of the drawing.

Referring to the drawing by numerals, 5 designates a bolt having the usual threads 6, and this bolt is formed with a groove 7 which runs the length of the threads thereon. Adjustably mounted upon the bolt is a nut 8, the same being formed at intervals in the threaded wall of the central aperture therein with grooves 9, each of which is adapted to be brought into alinement with the groove 7 in the bolt 5 so that a locking pin 10 may be driven into the alining grooves and thereby securely hold the nut against turning on the bolt, the pin being outwardly tapered so that it may be wedged in the alining grooves, and its outer surface is provided with serrations 11 which coact with the threads on the bolt to prevent the working of the pin 10 from the groove, thereby assuring the secure fastening of the nut in its adjusted position on the bolt.

Engaged on the bolt 5 is a washer 12 which abuts against the inner side of the nut 8 and is formed with a lug 13 which engages in the groove 7 in the bolt so as to prevent the said washer 12 from turning on the bolt but is permitted to be moved longitudinally thereon. The washer 12 at its outer periphery is designed to be out-turned by the bending thereof to form a tongue or ear 14 which is adapted to engage against one wrench engaging face of the nut 8 after the latter has been adjusted so as to assist in locking the nut in fixed position on the bolt. It is of course to be understood that the nut is first properly adjusted and thereafter the washer bent to form the tongue or ear 14 for engagement with the nut to hold the same. When it is desired to remove the nut or further adjust the same the tongue or ear 14 is bent into the plane of the body of the washer thereby permitting the nut to be readily turned.

In the operation of the nut lock the nut is adjusted on the bolt to the desired distance thereof until one of the slots 9 therein alines with the slot 7 in the bolt, and thereafter the pin 10 is driven into the alining grooves, thus securely fastening the nut in its adjusted position upon the bolt.

From the foregoing it is thought that the construction and manner of operation of the device will be clearly understood, and therefore a more extended explanation has been omitted.

What is claimed is:—

The combination with a bolt having a groove running lengthwise thereof, of a nut adjustably mounted on the bolt and having a plurality of grooves in the wall of its threaded central aperture, each groove being of a size corresponding to the groove in the bolt and adapted to aline therewith and an outwardly tapered locking member having two parallel sides interrupted to provide a series of rounded projections connected by arcuate depressed portions for engagement with the upper wall of the grooves in the nut and the lower wall of the groove in the bolt for locking the nut on the bolt, the interrupted sides of said key conforming to any irregularity between the said walls of the groove in the nut and the lower wall of the groove in the bolt.

In testimony whereof I affix my signature in presence of two witnesses.

ANWYL O. GARDINER.

Witnesses:
 E. G. RYKER,
 W. H. BECKER.